United States Patent
Tol et al.

(10) Patent No.: US 7,065,535 B2
(45) Date of Patent: Jun. 20, 2006

(54) METHODS AND DEVICES FOR RECORDING OR READING FILES ON/FROM A SEQUENTIAL MEDIUM AND SEQUENTIAL MEDIUM

(75) Inventors: Ronald Marcel Tol, Eindhoven (NL); Gerrit Jan Scholl, Eindhoven (NL); Wilhelmus Jacobus Van Gestel, Eindhoven (NL); Steven Broeils Luitjens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 448 days.

(21) Appl. No.: 10/122,739

(22) Filed: Apr. 15, 2002

(65) Prior Publication Data

US 2002/0161774 A1 Oct. 31, 2002

(30) Foreign Application Priority Data

Apr. 25, 2001 (EP) .................................. 01201494

(51) Int. Cl.
*G06F 17/30* (2006.01)

(52) U.S. Cl. ...................... 707/200; 707/101; 707/102; 707/103 R; 707/104.1; 369/47.54; 386/46

(58) Field of Classification Search ..................... 707/1, 707/10, 200, 101, 102, 104.1, 103 R, 205; 369/30.12, 47.54; 715/513, 514; 386/46
See application file for complete search history.

(56) References Cited

U.S. PATENT DOCUMENTS

| | | | | |
|---|---|---|---|---|
| 5,341,356 A | * | 8/1994 | Dieleman et al. | ......... 369/47.54 |
| 5,825,726 A | * | 10/1998 | Hwang et al. | ........... 369/30.05 |
| 5,878,019 A | | 3/1999 | Schylander et al. | ..... 369/275.3 |
| 6,665,690 B1 | * | 12/2003 | Kimura et al. | ............... 707/205 |
| 6,671,249 B1 | * | 12/2003 | Horie | ...................... 369/275.3 |
| 6,697,563 B1 | * | 2/2004 | Komoda | ....................... 386/45 |

OTHER PUBLICATIONS

Andy McFadden, "D-Recordable FAQ, Part 1 / 2", Internet, [Online], XP002201493.

* cited by examiner

*Primary Examiner*—Shahid Alam
(74) *Attorney, Agent, or Firm*—Edward W. Goodman

(57) ABSTRACT

In a method and a device for reading and a method and a device for recording files on a sequential medium as well as the sequential medium itself, in order to enable the use of sequential write-once mediums, the file system descriptor pointing to a current version of a management information area, is recorded on a reserved track being located at the beginning of the volume. Thereby, the management information area is recorded at a location behind files being recorded onto the volume.

4 Claims, 2 Drawing Sheets

| BP | Length | Name | Contents |
|---|---|---|---|
| 0 | 8 | Signature | SigRec |
| 8 | 1 | File System type | Uint8 |
| 9 | 3 | Reserved | #00 bytes |
| 12 | 4 | Start Address of Logical Volume | Uint32 |
| 16 | 4 | Length of Logical Volume | Uint32 |
| 20 | 4 | Start Address of File System Descriptor Sequence | Uint32 |
| 24 | 4 | Length of File System Descriptor Sequence | Uint32 |

| BP | Length | Name | Contents |
|----|--------|------|----------|
| 0  | 8 | Signature | SigRec |
| 8  | 1 | File System type | Uint8 |
| 9  | 3 | Reserved | #00 bytes |
| 12 | 4 | Start Address of Logical Volume | Uint32 |
| 16 | 4 | Length of Logical Volume | Uint32 |
| 20 | 4 | Start Address of File System Descriptor Sequence | Uint32 |
| 24 | 4 | Length of File System Descriptor Sequence | Uint32 |

METHODS AND DEVICES FOR RECORDING OR READING FILES ON/FROM A SEQUENTIAL MEDIUM AND SEQUENTIAL MEDIUM

BACKGROUND OF THE INVENTION

1. Field of the Invention

The invention relates to the recording and reading of files on a sequential medium including recording or reading of a management information area storing data structures that are used for volume and file management and recording or reading files onto the volume. Furthermore, the invention relates to a sequential medium comprising such a management information area and a volume containing files.

2. Description of the Related Art

Known optical digital video recording discs consist of a lead-in area, a data area and a lead-out area. A drive presents the data area to the file system. In general, a file system uses part of the data area for its own administration purposes and presents the remainder in some suitable way, using partitions, as a so-called logical volume, i.e., a logical contiguous address space to an application. Typically, a file system uses an anchor descriptor at so-called anchor points to find a reference to its management information area for volume structure.

JAFS (Joint Approach File System) is a volume and file management system intended to be used for both AV (Audio and Video) and computer applications. Most of the existing volume and file management systems are designed to be used only for computer applications, and as such, they lack the functions necessary for AV applications, such as real-time data reading and writing, or file dividing and combining without data movement. JAFS is designed to enable implementation of the above and other functions useful for AV applications in an effective manner.

The JAFS file system is defined for a randomly rewritable medium. Due to this definition, problems occur when using a sequential write-once medium.

SUMMARY OF THE INVENTION

It is therefore an object of the present invention to provide a definition of such a file system that also works for a sequential write-once medium.

This object is achieved by providing a method for recording files, a method for reading files, a device for recording files, a device for reading files, and a sequential medium.

The invention enables modifying, in particular adding or removing, files on a sequential, in particular write-once, medium such as a DVR-R (digital video recorder-recordable) medium. Thereby, the management information area needs to be updated by writing a new version of the management information area. As the data already recorded on the medium cannot be rewritten in a sequential write-once medium, the management information area has to be written as a new version at the end of files or data, such as management information area data already recorded on the medium.

Thus, new files added to the existing files are being registered in a new version of the management information area. Accordingly, "removed" files are no longer registered in the current management information area, and thus appear to be deleted, even though the data of these removed files is still on the medium.

As the management information area, according to the present invention, is located at the end of the files recorded on the medium, it is a problem to quickly find the current version of the management information area. However, a file system descriptor being located somewhere after the lead-in, i.e., at the beginning of the data track between the lead-in and lead-out area, points to the management information area. Thus, the management information area can be accessed rapidly.

The file system descriptor is written in a reserved track that is located somewhere after the region of a lead-in area, i.e., near the beginning of the medium. Thus, the file system descriptor may be accessed instantaneously. As the file system descriptor is written in a reserved track having a capacity, in particular, in terms of bytes, being much larger than the file system descriptor itself, new file system descriptors may be written in the reserved track in order to specify the current location of the management information area.

BRIEF DESCRIPTION OF THE DRAWINGS

Embodiments and modifications will be described in more detail with reference to the accompanying drawings, in which.

DESCRIPTION OF THE PREFERRED EMBODIMENTS

The following definitions are used in connection with the present invention:

The term "medium" defines means on which data is recorded.

The term "management information area" or MIA is a set of physical or logical sectors of which the sector numbers are consecutive. It is used to record data structures in units of physical or logical sectors. Data structures that are used for volume and file management are stored in the management information area. Various pieces of information about a volume are recorded in a management information area.

Preferably, in order to assure reliability, two management information areas for volume structure, in which two identical sets of information are recorded, shall be recorded on a physical volume. These are referred to as the main management information area for volume structure and the reserve management information area for volume structure.

The term "partition" represents a collection of physical sectors with continuous physical sector numbers in a physical volume.

The term "logical volume" is defined as a sequence of partitions. A logical volume may have partitions on different physical volumes. Thus, a logical volume may be constructed from partitions belonging to different physical volumes.

The term "descriptor" specifies the starting address and size of the main anchor or the reserve management information area and the location of the management information area map in the main and the reserve management information area. The locations where other anchor descriptor can be recorded are referred to as the anchor points.

Figure 1:
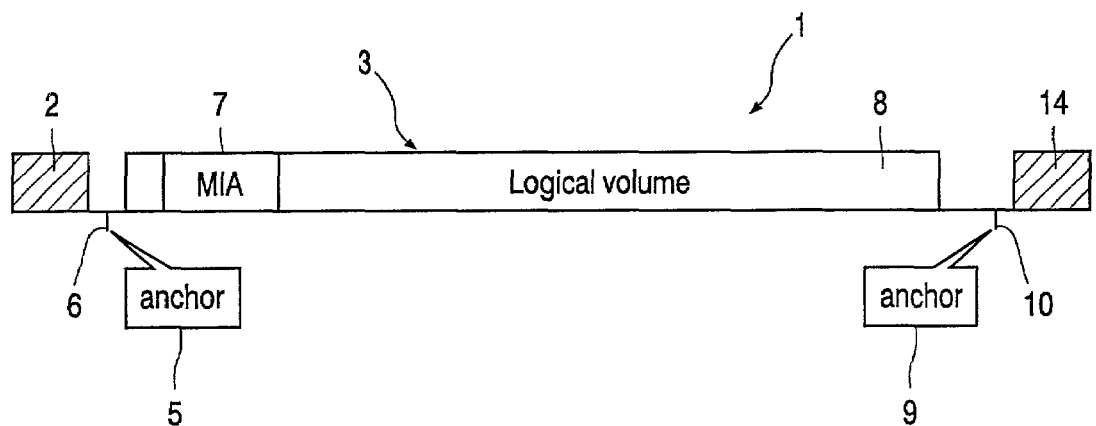
FIG. 1 shows a diagram of a data system of an optical DVR disc according to the prior art JAFS specification.

FIG. 1 shows a diagram of an optical digital video recording disc 1 consisting of a lead-in area 2, a data area 3, and a lead-out area 4. A drive (not shown) presents the data area 3 to a file system. The file system uses an anchor descriptor 5 at a so-called anchor point 6 to find a reference to its management information area 7 for file structure. The management information area 7 stores information about the data structure in a logical volume 8. A further anchor descriptor 9 is located at a further anchor point 10 near the lead-out area 4.

The data structure as shown in FIG. 1 may not be modified in terms of adding or removing files in case of using a sequential write-once medium, as a recordable, but only, when using a randomly rewritable medium. If files are modified, in particular, added, removed, divided, or combined, the management information area 7 needs to be updated. However, this is not possible when using the structure shown in FIG. 1 in combination with a sequential write-once medium.

Figure 2:
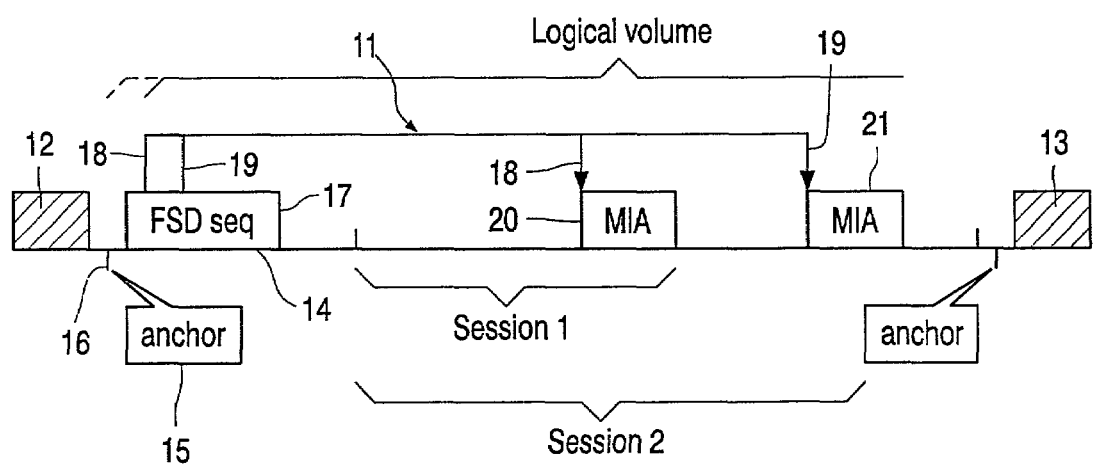
FIG. 2 shows a data system according to a preferred embodiment of the present invention.

FIG. 2 shows the structure of an optical digital video recording disc according to the invention. Similar to FIG. 1, a data area 11 is located between a lead-in area 12 and a lead-out area 13.

However, contrary to FIG. 1, a management information area is not located near the lead-in area 12. Rather, a reserved track 14 is located near the lead-in area 12 being found by an anchor descriptor 15 at an anchor point 16. In particular, the reserved track is located at the beginning of the logical volume.

The reserved track 14 contains a sequence 17 of file system descriptors (FSD) 18, 19.

A first file system descriptor 18 points to a first management information area 20 belonging to a session 1. However, since a further session has been created, namely session 2, a second file system descriptor 19 has been recorded in the reserved track 14 pointing to a second management information area 21, namely, according to the embodiment of FIG. 2, the current management information area.

Even though the first management information area 20 is still physically on the disc, this first management information area 20 is no longer valid due to the creation of the second management information area 21. Thus, e.g., files contained in session 1 may have been removed logically, even though they still physically exist on the disc. However, they cannot be accessed any longer. Files added during session 2 are located between the first management information area 20 and the second management information area 21.

If the subsequent session is being created, this is done by recording a new management information area located behind (i.e., after) the files being added during the subsequent session, that are being recorded behind the preceding management information area. However, if no files have been added but some files from the preceding session have been removed or renamed, a new management information area is recorded adjacent to the preceding management information area, i.e., at a location behind the preceding management information area. However, in any case, the management information area is recorded at the end of a session.

Every time a new management information area is recorded, a further file system descriptor is added to the sequence of file system descriptors in the reserved track. The latest file system descriptor points to the current version of the management information area.

Figures 3, 4:
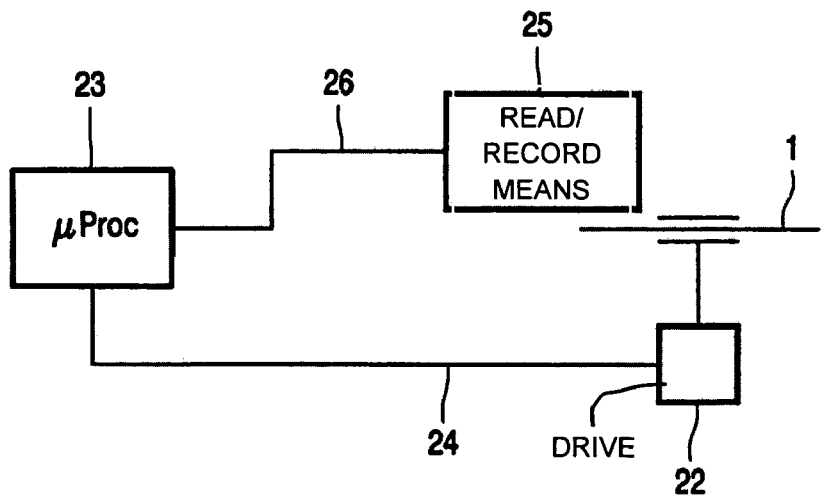
FIG. 3 shows an anchor descriptor.
FIG. 4 shows a schematic block diagram of a device for recording and/or reading files on/from an optical DVR disc.

FIG. 3 shows a proposed anchor descriptor as being recorded at an anchor point, including a signature, a file system type, a reserved data block, a start address of logical volume, a length of logical volume, a start address of file system descriptor sequence, and a length of file system descriptor sequence.

The start address of the logical volume is a physical address. The length of the logical volume is in physical sectors. The start address of the file system descriptor sequence is a logical address. The length of the file system descriptor sequence is in logical sectors.

If the file system type is random access, the file system descriptor sequence consists of one file system descriptor. However, if the file system type is sequential, all file system descriptors in a file system descriptor sequence shall be aligned at error correction code blocks and the file system descriptor sequence shall be terminated by an unrecorded block.

An example is given in order to illustrate this situation of file system descriptors in more detail:

Assumed is a 24 GB digital video recording recordable disc (DVR-R disc). If one wants to add, in increments of five minutes, audio/video data at a bit rate of 4 Mbit/s (=150 MB), then 24 GB/150 MB=160 file system descriptors 18, 19 in the file system descriptor sequence need to be recorded. Assumed that an error correction code block is 64 kB, this takes about 10 MB.

If the number of increments shall not be limited, the pointer descriptor to the next file system descriptor sequence is defined, thus preferably resulting in more than one file system descriptor sequences on one disc or medium.

Preferably, for robustness reasons, a separate reserve file system descriptor sequence is added.

FIG. 4 shows a schematic block diagram of a device for recording and/or reading files on/from an optical DVR disc, the device including a drive means 22, e.g., an electrical motor for driving the optical DVR disc 1. The drive means 22 is connected to a microprocessor 23 by means of an electrical cable 24. The microprocessor 23 is connected with means 25 for reading and/or recording files from/on the optical DVR disc by means of a data bus 26.

The microprocessor 23 is programmed in order to cause, in a recording mode, the means 25 to record a management information area 20, 21 at a location behind the above-mentioned files and to record a file system descriptor 18, 19 pointing to the current version of the management information area 21 onto the reserved track 14 at a location at the beginning of the volume.

Furthermore, the microprocessor 23 is programmed in order to cause, in a reading mode, the means 25 to read the reserved track 14 containing the file system descriptor 18, 19 at a location at the beginning of the volume, and then to read the management information area 20, 21 from a location behind the files by means of the file system descriptor 18, 19 pointing to the current version of the management information area 21.

Summarized, the main idea of the invention is to start a sequential medium with a reserved track that contains a file system descriptor pointing to the current management information area being located at the end of the latest session thus enabling access to files added and not being removed during the current session and during previous sessions. As the current management information area contains the information to access files, files that are not registered in the current management information area are excluded from the current session, thus appearing to be deleted.

The invention may be embodied in terms of a method for reading and a method for recording data from/on a medium according to the described data structure as well as in terms of corresponding devices for reading or recording data of that structure, i.e., for carrying out said methods.

Furthermore, a data carrier or medium recorded by such a method or by such a device is a product according to the invention. It may be read by a method or device for reading such data structure. Therefore, protection is sought according to the independent claims.

The invention claimed is:

1. A method for recording files on a sequential medium, said method comprising the steps of:
    a) recording a management information area storing data structures in a volume on a sequential medium, said data structures being used for volume and file management; and
    b) recording files onto the volume, characterized in that
    c) the management information area recording step records the management information area at a location behind said files, and said method further comprises the step of:
    d) recording a file system descriptor pointing to the current version of the management information area onto a reserved track locate at the beginning of the volume,
    characterized in that said method further comprises the step of:
        creating a subsequent session by recording a new management information area located at a location behind the preceding management information area, or behind files being added during the subsequent session behind the preceding management information area.

2. The method as claimed in claim 1, characterized in that said method further comprises the step of;
    recording a further file system descriptor onto the reserved track pointing to the new management information area.

3. A method for recording and reading files on a sequential medium, said method comprising the steps of:
    recording management information onto a management information area of the medium, the management information area containing data structures that are used for volume and file management;
    recording files onto a file area of the medium, the file area being located before the management information area;
    recording a file system descriptor onto a reserved track of the medium, the file system descriptor pointing to the current version of the management information area, the reserved track being located at the beginning of the volume before the file area;
    reading the file system descriptor from the reserved track;
    reading the management information from the management information area using the file system descriptor read from the reserved track; and
    reading files from the volume using the management information read from the management information area.

4. A device for recording and reading files to/from a sequential medium comprising:
    recording means for recording management information onto a management information area of the medium, the management information area containing data structures that are used for volume and file management, said recording means further recording files onto a file area of the medium, the file area being located before the management information area, and said recording means further recording a file system descriptor onto a reserved track of the medium, the file system descriptor pointing to the current version of the management information area, the reserved track being located at the beginning of the volume before the file area; and
    reading means for reading the file system descriptor from the reserved track, the reading means further reading the management information from the management information area using the file system descriptor read from the reserved track, and the reading means further reading files from the volume using the management information read from the management information area.

* * * * *